Dec. 3, 1957 T. F. KRUMM 2,815,022
BODY TRACTION DEVICE.
Filed July 20, 1954 2 Sheets-Sheet 2
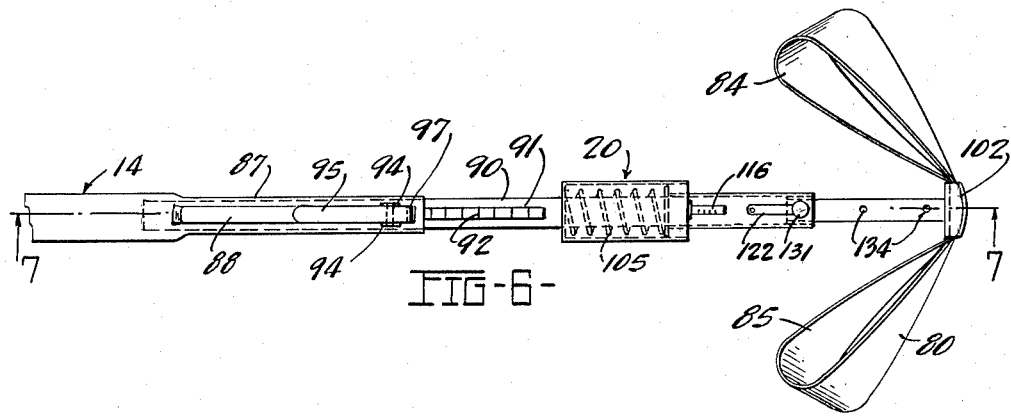
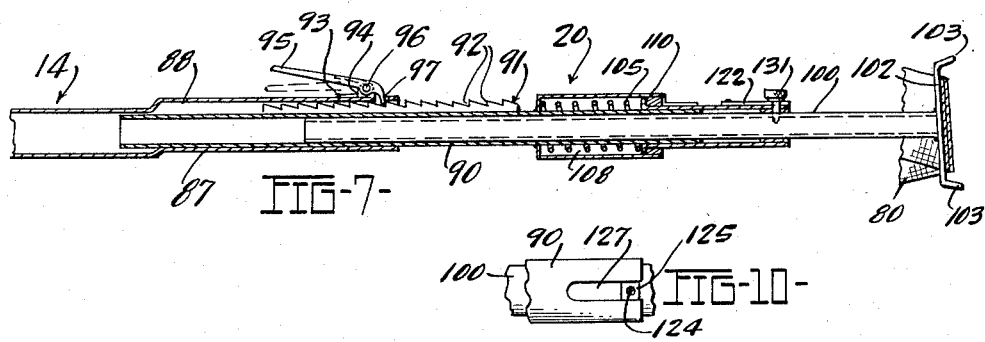
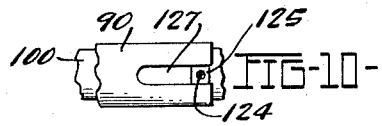
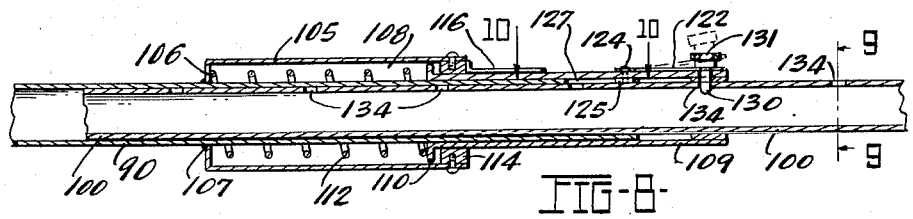
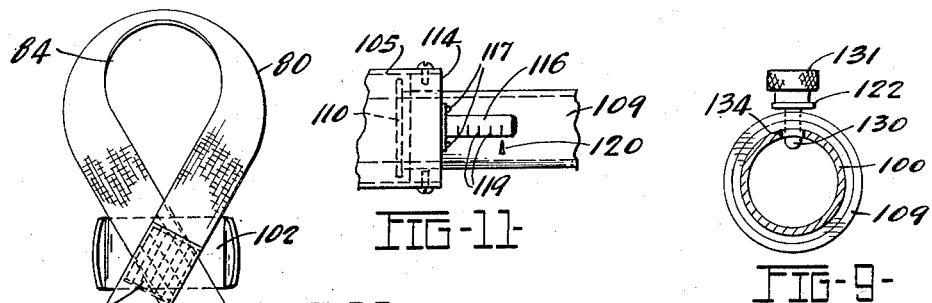
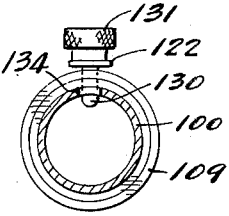
Inventor:
THOMAS F. KRUMM.
By Harry O. Ernsberger
Attorney

United States Patent Office 2,815,022
Patented Dec. 3, 1957

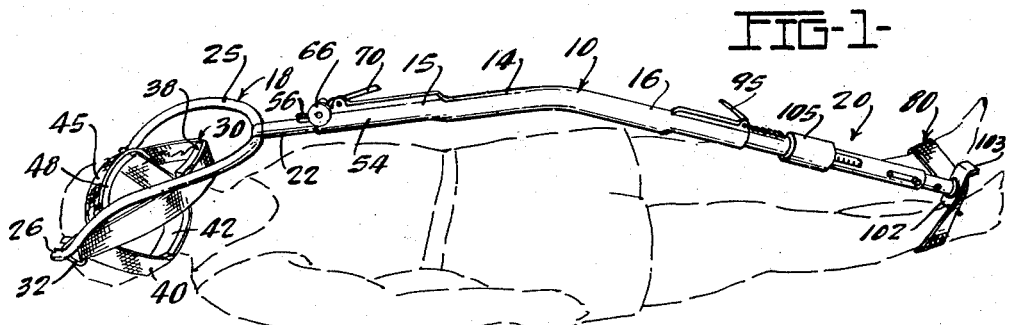
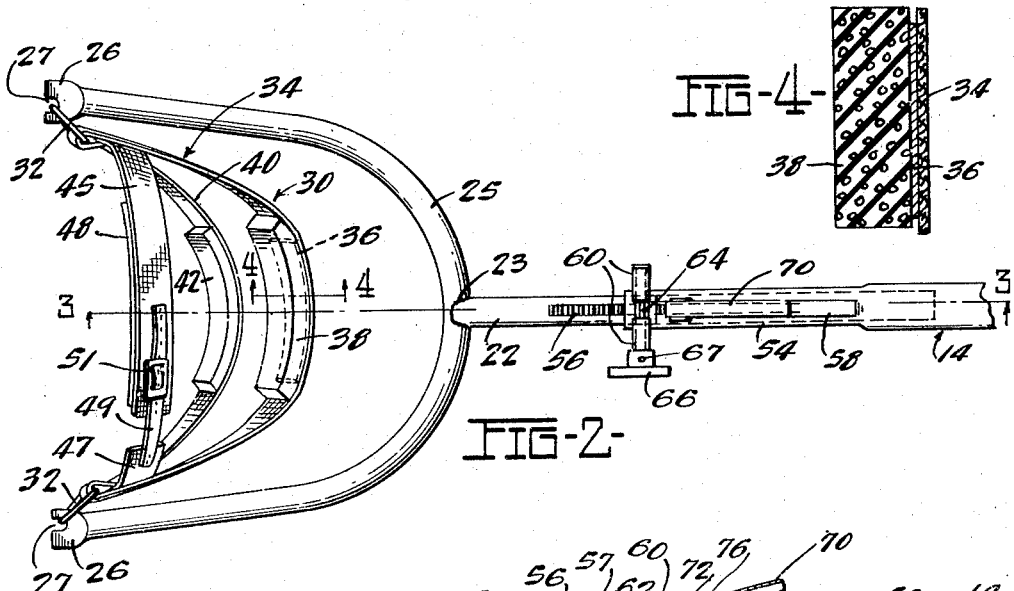
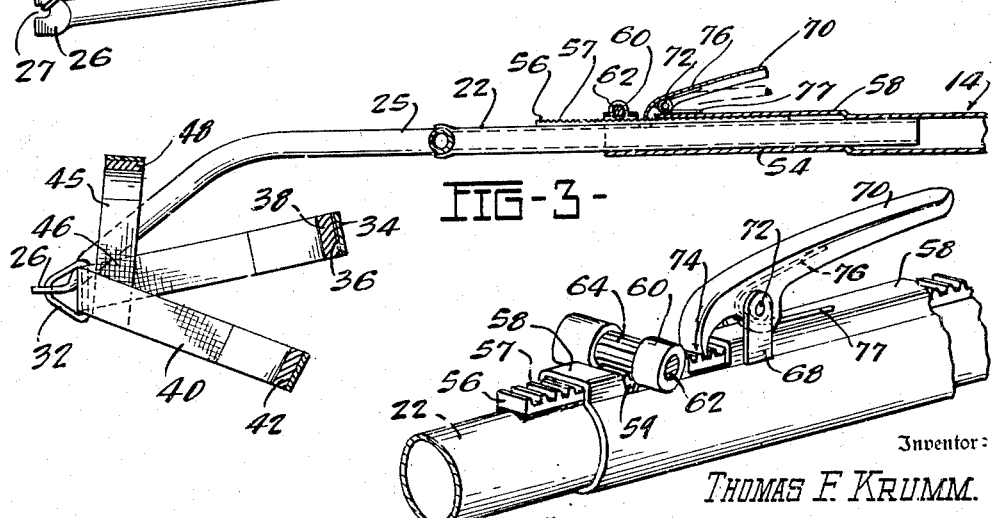

2,815,022

BODY TRACTION DEVICE

Thomas F. Krumm, Toledo, Ohio

Application July 20, 1954, Serial No. 444,531

8 Claims. (Cl. 128—84)

This invention relates to traction devices and more especially to apparatus or devices usable for relaxing, tensioning and conditioning the spinal column, muscles and tendons of the human body.

The invention embraces a traction device or apparatus particularly for treating or relaxing the human body in which the device or apparatus may be used on the human body by a physician or other person or by the user himself.

An object of the invention is the provision of an apparatus of comparatively light weight which may be readily and and quickly applied to the human body for exerting a stretching or tension force on the body to relax ligaments, muscles and fibrocartilages of the spinal column.

Another object of the invention is the provision of a device of this character wherein the pulling, stretching or tensioning force or stress may be minutely adjusted or controlled by the user of the device or apparatus.

Another object of the invention is the provision of a treating device for the human body which may be adjusted for application to persons of various heights whereby the apparatus is rendered usable for children as well as adults.

Another object of the invention is the provision of a traction device for a human body wherein the user of the device may regulate and control the tension on his body, the device including means for locking or holding the structure in an adjusted position of tension whereby the tension or stretching force may be maintained on the body for any period of time.

Another object of the invention is the provision of an indicating means for directly ascertaining the extent or amount of tension or stretching force applied to the body.

Still another object is the provision of a body-treating or relaxing apparatus which is lightweight and portable and which may be quickly disassembled to occupy a comparatively small space when not in use.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a form of apparatus of the invention illustrating the method of application of the apparatus to the human body;

Figure 2 is a plan view of the upper portion of the apparatus shown in Figure 1;

Figure 3 is a longitudinal sectional view taken substantially on the line 3—3 of Figure 2;

Figure 4 is an enlarged detail sectional view taken substantially on the line 4—4 of Figure 2;

Figure 5 is a perspective view illustrating an adjusting means forming part of the apparatus;

Figure 6 is a plan view of the lower portion of the apparatus shown in Figure 1;

Figure 7 is a longitudinal sectional view taken substantially on the line 7—7 of Figure 6;

Figure 8 is an enlarged detail sectional view of a portion of the construction shown in Figure 7;

Figure 9 is an enlarged transverse sectional view taken substantially on the line 9—9 of Figure 8;

Figure 10 is a fragmentary detail sectional view taken substantially on the line 10—10 of Figure 8;

Figure 11 is a fragmentary detail view of a portion of the construction illustrating a tension-indicating means, and Figure 12 is a plan view of an ankle-engaging means forming part of the apparatus.

Referring to the drawings in detail there is illustrated a form of apparatus of the invention which is provided with a frame structure and means engageable with upper and lower zones of a human body for carrying out the purposes of the invention. The frame structure 10 is inclusive of telescopically arranged tubular elements which are interconnected in a manner hereinafter described and which are adapted to be disposed generally longitudinally of the body with which the device is used. The central portion of the frame structure includes a tubular member 14 which is formed of two angularly related portions 15 and 16 as shown in Figure 1. The tubular frame portion 14 is connected with or supports a component or construction 18 having means for engagement with the chin and head of the body while the tubular portion 16 telescopically receives a component or construction 20 provided with means for engaging the ankles of the body.

The component 18 at the upper portion of the structure is formed with a tube or member 22 which is welded as at 23 to the bight portion of a U-shaped tubular member 25. The extremities of the furcations of U-shaped tubular member 25 are flattened as shown at 26 and the flattened portions are provided with notches 27 to receive a chin and head-engaging means or harness 30.

The means 30 adapted to fit the chin and head of the body is inclusive of triangular members 32 formed of metal which are removably engageable in the notches 27 formed in the end zones of the U-shaped member 25. A strap or band 34 formed of heavy canvas or similar material extends through the triangular members 32 and is stitched to one leg of each triangular member to avoid displacement of the strap relative to the members 32. Disposed at the central zone of the strap 34 is a metal reinforcing plate or element 36 glued or adhesively bonded thereto, and disposed on the reinforcing member 36 and adhesively bonded to the reinforcement and the strap is a chin pad 38 particularly shown in Figures 2 and 4, the pad being preferably formed of sponge rubber or other material of resilient or yieldable character. The portion 40 of the strap 34 is adapted to engage and partially surround the rear of the head, the central zone of the strap portion 40 being provided with a pad 42 formed of sponge rubber or other yieldable material.

A band or strap 45 has an end zone stitched, as at 46, to the strap 34 adjacent one of the triangular members 32. A second strap or band 47 is stitched to the strap 34 adjacent the other of the triangular members 32 and is equipped with a pad 48. Stitched to the member 47 is a strap 49 of narrower width which engages with a buckle construction 51 secured to the strap 45 for purposes of adjusting the construction to fit the head. The above-described harness arrangement is fitted to the head of the individual by engaging the pad 38 with the chin in the manner shown in Figure 1, the bands or straps 40 and 45 embracing or encircling the head of the user of the device with the pad 42 contacting the rear of the head and the pad 48 disposed on the forehead.

The tubular member 22 of the upper component 18 is slidably telescoped with a tubular portion 54 of the intermediate frame member 14 which has been formed with a smaller diameter than the portion 14. Welded or brazed to the tube 22 is an elongated rack bar or member 56 provided with teeth 57. The tubular portion 54 of the intermediate frame member 14 is shaped to provide a rectangular, raised portion 58 which is of a dimension to accommodate the rack bar 56 in the manner shown in Figure 5. The upper zone of the rectangular portion 58 of tube 54 is formed of a notch 59. Disposed in the notch is a transversely disposed, cylindrical sleeve or tube 60, a portion being broken away in Figure 5 for purpose of illustration, the tube being brazed or welded to the portion 58. Revolubly mounted or journaled within the tube 60 is a shaft 62 having a pinion portion 64 adapted to mesh with the teeth 57 in the rack bar 56. The shaft 62 is equipped with a manipulating means in the form of a handwheel 66 secured to a projecting portion of the shaft by means of a pin 67. By rotating the handwheel 66 and shaft 62, the teeth 64 of the shaft engaging the teeth 57 of the bar 56 effect longitudinal movement of the harness construction 34 engaged with the chin of the user of the device.

Means is provided for retaining the tubular member 22 in positions in which it may be adjusted by means of the handwheel 66. As particularly shown in Figure 5, a pair of upwardly extending ears or members 68 are secured to the exterior surfaces of the side walls of rectangular portion 58 by welding, brazing or other suitable securing means. Disposed between the members 68 is a locking lever or member 70 pivotally supported upon a pin 72 extending through openings in the members 68 and downwardly extending portions of the locking lever 70. The lever 70 is provided with a detent or pawl portion 74 which is adapted for engagement in the recesses between adjacent teeth 57 on bar 56 to restrain tube 22 against relative longitudinal movement of the frame component 14 in a righthand direction as viewed in Figure 5. A coil spring 76 surrounding the pin 72 has one end portion 77 in contact with the upper surface of portion 58, the other end portion 78 of the spring engaging the lever 70. The spring is arranged to exert counterclockwise bias against the locking lever 70 as viewed in Figure 3 to urge the detent 74 of the lever into engagement with teeth formed on the bar 56. When it is desired to release the detent from engagement with bar 56, the locking lever or member 70 is moved or pivoted in a clockwise direction as viewed in Figure 3. With the locking lever 70 in pawl-released position, the tubular member 22 may be moved in either direction by movement of handwheel 66. The shape of the detent 74 is such that when the detent 74 is in engagement with the teeth 57, it prevents movement of tube 22 into the tube portion 54 but permits withdrawl of tube 22 away from the tubular portion 54 by movement of the handwheel 66. The bar 56 is arranged for slidable movement within the rectangular portion 58 of the component 14 and serves as a guide means to prevent relative rotation between tube 22 and tubular portion 54 of the frame component 14.

A means is provided which may be readily engaged with the ankles of the individual using the device in order to establish a thrust connection with the lower portion of a body, effective through the arrangement of the invention to exert a tension on the body and particularly the spinal column. A form of means engageable with the ankles is shown at 80 in Figure 12. The ankle-engaging means 80 is formed of a strip of comparatively heavy cloth or canvas, the end zones of the strip being overlapped and stitched as at 82 to form an endless construction. As shown in Figure 12, the strap is fashioned in the form of a figure eight, providing loops 84 and 85 through which the feet of the user may be inserted to position the strap 80 on the ankles of the user in the manner shown in Figure 1.

The frame component 14 is formed with a tubular portion 87 of reduced diameter which is fashioned with a rectangular portion 88 raised above the tubular portion 87 as shown in Figure 7 and is of a construction substantially identical with the rectangular, raised portion 58 and tubular portion 54 fashioned at the other end of the frame component 14. Telescoped within the tubular portion 87 is a tube 90 to which is welded or brazed a rack bar 91 provided with teeth 92. The bar 91 is of a width to be snugly yet slidably received into the rectangular-shaped, raised portion 88 and serves as a guide means to prevent relative rotation between tube 90 and the tubular frame component 14. Welded to the side walls of portion 88 are projections 94, and disposed between the projections is a locking lever or member 95 of a construction, substantially identical with the locking lever 70. A pin 96 extends through openings in the projections 94 and locking lever 95 to provide a pivotal support for the locking lever. The lever 95 is provided with a pawl or detent 97 adapted for engagement with the teeth 92 of the rack bar 91. The teeth 92 fashioned in the bar 91 are of ratchet shape whereby relative movement of the tube 90 with respect to the tube portion 87 in a righthand direction as viewed in Figure 7 permits the detent 97 to override the teeth 92, but the detent 97 prevents movement of the tube 90 in a lefthand direction unless the lever 95 is swung to a position withdrawing the detent 97 from engagement with the teeth 92. A spring means 93 of a character similar to spring means 76 is associated with the locking lever 95 and the raised portion 88 of tubular portion 87 to normally, resiliently bias the detent 97 into engagement with the teeth 92.

Slidably disposed within the tube 90 is a tube or member 100. Welded or otherwise secured to the outer end of tube 100 is a metal pad portion 102 having upper and lower flanges 103, the pad portion adapted to engage the central crossing zone of the ankle strap 80 as shown in Figures 6 and 12, the flanges 103 embracing the edges of the strap 80 to prevent displacement of the pad 102 with respect thereto. As shown in Figure 8, a sleeve 105 having an end wall 106 surrounds a portion of the tube 90, providing an annular space or chamber 108. The sleeve is secured to the tube 90 by welding or brazing the end wall 106 to the tube 90 as indicated at 107. Surrounding the tube 90 at one side of the sleeve 105 is a tubular member or sleeve 109 having an end portion extending into the sleeve 105 provided with an outwardly extending flange 110. An expansive coil spring 112 is disposed between the end wall 106 and the flange 110 formed on tube 109 in the chamber 108, the spring serving to resist inward movement of tube or sleeve 109 into sleeve 105. The spring 112 forms a force counterbalancing means for indicating, in a manner hereinafter explained, the amount of stretching force or tension being placed upon the body of the user. A ring or annular member 114 provides a closure for the opposite end of the sleeve 105 and functions as an abutment to limit the movement of the sleeve or tube 109 in a righthand direction as viewed in Figure 8. An indicator plate 116 is secured by means of screws 117 to the ring 114. The indicator plate 116 bears a series of indicia or graduations 119 and the tube 109 is provided with an index 120 cooperating with the indicia 119 to indicate in pounds or other suitable weight unit the amount of tension or pulling force applied to the body of the user, the force compressing the spring 112 and being indicated on the scale or indicator 116 by the position of a particular graduation 119 in registeration with the index 120.

Means is provided associated with tubes 100 and 109 for adjusting the position of the tube 100 with respect to the tube 109. As shown in Figure 8, a plate-like member 122 forming a plate spring is secured to tube 109 by means of a screw 124 passing through openings in the member 122 and tube 109 and into a threaded opening in a rectangularly shaped block or key 125. By this means one end of the spring plate 122 is secured to member 109. The key 125 is of a width to be slidably received within a slot 127 formed in an end zone of the tube 90 as shown in Figure 10. The key or member 125 prevents relative rotation between the tube 90 and tube 109. Secured to the end zone of plate 122 is a securing pin 130 having a knurled manipulating knob 131. The tube 100 is provided with a series of bores or openings 134, the openings being spaced longitudinally of the tube and in alignment with pin 130. When it is desired to make an adjustment of tube 100 relative to tube 109, the spring plate 122 is flexed upwardly by manipulation of the knurled knob 131 to withdraw pin 130 from one of the openings 134, sliding the tube 100 longitudinally to the desired distance, the user permitting the pin 130 under the inherent stress of plate spring 122 to enter another of the openings 134 in the tube 100. The key 125 engaging in slot 127 of tube 90 prevents rotation of the tube 109 relative to tube 90.

When used on his own body by a person, the traction device or apparatus of the invention is applied and used in the following manner. The user inserts his feet through loops 84 and 85 of strap 80 whereby the strap embraces the ankles in the manner illustrated in Figure 1. The user affixes the strap construction or harness 30 to the chin by placing the pad 38 beneath his chin, placing the pad 48 carried by strap 45 on his forehead and affixing the pad 42 at the back of the head. The arrangement may be adjusted to fit the head of the individual or user by adjusting the relative position of the strap 49 with respect to the buckle or retaining device 51 shown in Figure 2. After the ankle strap 80 and the head harness 30 have been applied in the above-described manner, the user engages the bracket or abutment 102 with the bight portion or crossing zone 82 of the strap 80 in the manner shown in Figures 1 and 6. The user then extends the portion 14 in a longitudinal direction to engage the triangularly shaped members 32 in the notches 27 of the U-shaped member 25, the pawl 97 of locking lever 95 overriding the teeth 92 of bar 91 during such longitudinal movement of the component 14 of the construction. If the detent or pawl 97 moves beyond the bar 91 during the above-mentioned movement of componet 14, adjustment to obtain proper length must then be made by extending tube 100 with respect to tube 90. To accomplish this, the user grasps the knurled knob 131 and exerts an upward force to withdraw pin 130 from an opening 134 in the tube 100 and slides tube 100 upwardly with respect to tube 90 to a position bringing another of the openings 134 into registration with pin 130. Upon the release of knob 131 the inherent flexure in the spring 122 engages pin 130 in the adjacent opening 134; and in this manner, the device may be adjusted to the approximate length of the user's body. The minor adjustment or extension movement of component 14 with respect to the tube 90 and tube 100 is accomplished by the pawl 97 overriding the teeth 92 on bar 91 until an initial position of minor tension on the body is obtained.

After the device or apparatus has been affixed to the user's body in the above-described manner, a stretching or tension force may then be applied to the body by the user grasping handwheel 66 and rotating pinion shaft 62 to move tubular member 22, member 25 and harness 30 in a direction away from the component 14, thus exerting a pulling or stretching force upon the body simply by rotating the handwheel 66. When the user has thus impressed a particular amount of tension or stretching force on his body, the tension is maintained by the automatic engagement of the pawl or detent 74 in the recesses between successive teeth 57 formed in the bar 56. Thus, the user may secure a minute adjustment of the tension on his body by moving the handwheel 66 to bring the next succeeding tooth 57 into engagement with the pawl 74. The pawl 74 automatically locks the device at the particular position to which the structure has been moved by the user through manipulation of handwheel 66. It has been found that the best results are obtained when the user places his body under a particular degree of tension and maintains that tension for several minutes before placing additional tension on his body by movement of the handwheel.

It will be noted that when the treatment or period of relaxation has been completed, the user grasps locking lever 70 and withdraws the pawl 74 from engagement with teeth 57, permitting tubular portions 52 and 54 to telescope and relieve all tension on the user's body.

From the foregoing description it will be apparent that the arrangement of the invention may be used to full advantage by an individual without the assistance of a doctor or other person. It is to be understood, however, that the device may be applied to human bodies by a physician or other person and that handwheel 66 may be manipulated either by the person to whom the device is applied or by the physician or other person applying the device, and the amount of tension or stretching force may be ascertained by the physician or other person through noting the position of the indicating device 116 relative to the index 120 shown in Figures 6 and 11. Through the use of the tension or force-indicating device particularly illustrated in Figures 1, 6 and 11, one person applying the device to another is able to accurately determine the particular force applied through the apparatus to a body.

The arrangement of the invention is of lightweight, tubular construction so as to be easily assembled and handled by the user. The several components of the device are readily disconnectable for storage purposes. When it is desired to store the construction, the triangular metal members 32 are unhooked from the notches 27 in member 25 and the tube 22 is withdrawn from telescoping relation with the frame component 14. The frame component 20 may be disconnected from frame component 14 by simply withdrawing the tube 90 from telescoping engagement with the tubular component 14. The manipulating knob 131 associated with pin 130 is elevated to withdraw the pin from engagement with an opening 134 in the tube 100 whereby the latter may be withdrawn from telescoping engagement with the tube 90. In this manner the several components may be quickly disassembled and stored in a position out of use and readily reassembled to operative position when desired.

It is apparent that, within the scope of the invention, modifications and different arrangements may be made other than is herein disclosed, and the present disclosure is illustrative merely, the invention comprehending all variations thereof.

I claim:

1. Traction apparatus for treating the body, including in combination, a tubular member, a tubular element telescopingly associated with an end zone of the tubular member, a strap engageable with the ankles of the body, a bar having a pad portion connected with the ankle-engaging strap, said bar being connected with the tubular element, means arranged between the bar and tubular element for adjusting the relative position of said bar with respect to the tubular element, a harness formed of flexible material engageable with the chin of the body, means carrying the harness and having connection with the other end zone of the tubular member, said harness carrying means including rack and pinion mechanism for adjusting the relative position of said harness-carrying means with respect to the tubular member, manually operated means connected with the pinion for rotating the pinion, and means carried by the tubular member engageable with the rack for retaining the harness-carrying means in adjusted position relative to the tubular member.

2. Traction apparatus for treating the body, including in combination, a tubular member, a tubular element telescopingly associated with one end zone of the tubular member, a flexible strap engageable with the ankles of the body, a tube having a pad portion engageable with the ankle-engaging strap, said tube being adjustably connected with the tubular element, means arranged between the tube and tubular element for securing said tube in adjusted position with respect to the tubular element, a harness formed of flexible material engageable with the chin of the body, means including a U-shaped member carrying the harness and having a tubular portion telescopingly associated with the other end zone of the tubular member, rack and pinion mechanism connecting the harness-carrying means and the tubular member for adjusting the relative position of said means with respect to the tubular member, a handwheel for rotating the pinion, and pawl means carried by the tubular member adapted to engage the rack for retaining the harness-carrying means in adjusted position relative to the tubular member.

3. A traction device for applying tension to a body including, in combination, a tubular frame member, a U-shaped element having a tubular portion extending into one end of the tubular frame member, a rack secured to the tubular portion, a pinion revolubly supported on said frame member and in mesh with the teeth of the rack, a handwheel connected with the pinion for rotating the pinion, a harness connected with the U-shaped element arranged to engage the chin of the body, an ankle-engaging strap, a tube having a pad portion abutting against the ankle-engaging strap, a tubular element having telescoping connection with said tubular frame member and said tube, said tubular element being adjustable with respect to the tubular frame member, and pawl means carried by the frame member and engageable with the rack for maintaining said U-shaped element and tubular frame member in adjusted position.

4. Traction apparatus for exerting longitudinal tension on a body including, in combination, a tubular member, means formed with a rectilinear portion telescoped with the tubular member, a harness carried by said means arranged to engage the head of the body, a rack carried by the rectilinear portion, a pinion carried by the tubular member meshing with the rack for adjusting the position of the head-engaging harness relative to the tubular member, locking means carried by the tubular member for normally restraining movement in one direction of said means relative to the tubular member, an ankle-engaging element, an elongated member having a pad portion abutting the ankle-engaging element, said elongated member having a plurality of openings formed therein, a tubular means telescoped with the tubular member, said tubular means being formed with a portion of enlarged diameter providing a chamber, a spring in the chamber, a sleeve slidably disposed within the tubular means and having a flange extending into said chamber engaging the spring, a pin carried by the sleeve and selectively engageable with the openings in said elongated member for adjusting the position of the elongated member relative to the tubular means, and an indicator connected to the tubular means for indicating the tension force applied to the body.

5. Traction apparatus for exerting longitudinal tension on a body including, in combination, a tubular member, a U-shaped member having a rectilinear portion telescoped with the tubular member, a harness arranged to engage the head of the body connected to the U-shaped member, a rack carried by the rectilinear portion, a pinion carried by the tubular member mashing with the rack for adjusting the position of the U-shaped member relative to the tubular member, pawl means carried by the tubular member for normally restraining movement in one direction of the U-shaped member relative to the tubular member, a strap arranged for engagement with the ankles of the body, a tube having a pad portion abutting the ankle-engaging strap, said tube having a plurality of openings in the wall thereof, a tubular means telescoped with the tubular member, said tubular means being formed with a portion of enlarged diameter forming a chamber, a coil spring in the chamber, a sleeve surrounding the tubular means and having a flange extending into said chamber engaging the spring, a locking pin carried by the sleeve selectively engageable with the openings in said tube for adjusting the position of the tube relative to the tubular means, pawl and ratchet mechanism arranged between said tubular member and the tubular means, for retaining said member and tubular means in adjusted position and an indicator carried by the tubular means for indicating the tension force applied to the body.

6. Traction apparatus for exerting longitudinal tension on a body including, in combination, a tubular member, a U-shaped member having a rectilinear portion telescoped with the tubular member, a harness arranged to engage the chin of the body connected to the U-shaped member, a rack carried by the rectilinear portion, a pinion carried by the tubular member meshing with the rack for adjusting the position of the U-shaped member relative to the tubular member, pawl means carried by the tubular member adapted to engage the rack for normally restraining movement in one direction of the U-shaped member relative to the tubular member, a strap adapted to be engaged with the ankles of the body, a tube telescoped in the tubular member having a pad portion engaging the ankle-engaging strap, said tube having a plurality of openings in the wall thereof, a tubular means telescoped with the tubular member, a locking pin carried by the tubular means selectively engageable with the openings in said tube for retaining the tube in adjusted position relative to the tubular means, and pawl and ratchet mechanism arranged between said tubular member and the tubular means for retaining the tubular means in adjusted position relative to the tubular member.

7. A traction device for applying tension to a body including, in combination, a tubular frame member, a U-shaped element having a tubular portion extending into an end of the tubular frame member, a rack secured to the tubular portion of the U-shaped element, a pinion revolubly supported on said frame member and meshing with the teeth of the rack, a manipulating means connected with the pinion for rotating the same, means including a flexible strap connected with the U-shaped element arranged to engage the chin of the body, an ankle engaging strap, a tube having a pad portion abutting the ankle engaging strap, a tubular element arranged between and having telescoping connection with said tubular frame member and said tube, a flange on the tubular element, a sleeve formed with a flange, surrounding the tube, a spring disposed between the flanges, said tubular element being adjustable with respect to the tubular frame member, means carried by the frame member for retaining the frame member and tubular element in adjusted position, and indicating means carried by the sleeve for indicating the tension applied to the body.

8. Traction apparatus for exerting longitudinal tension on a body including, in combination, a tubular member, a harness arranged to engage the head of the body, a harness carrying means having a rectilinear portion telescoped with the tubular member and arranged to be connected with the harness, a rack carried by the rectilinear portion, a pinion journaled on the tubular member and mashing with the teeth of the rack for adjusting the position of the U-shaped member relative to the tubular member, pawl means carried by the tubular member for normally restraining movement in one direction of the harness carrying means relative to the tubular member, a flexible strap adapted to engage the ankles of the body, a plurality of telescoping elements disposed between the tubular member and the flexible strap whereby relative movement between the head engaging harness and the tubular member exerts a thrust on the ankles through the flexible strap and establishes tension in the body, resilient means engaging two of the telescoping elements adapted to be distorted upon establishment of tension in the body, and an indicator carried by one of said elements cooperating with another of the elements for indicating the tension force applied to the body.

References Cited in the file of this patent

UNITED STATES PATENTS

| | | |
|---|---|---|
| 3,263 | Jarvis | Sept. 14, 1843 |
| 76,382 | Barnes | Apr. 7, 1868 |
| 1,605,578 | Clark | Nov. 2, 1926 |

FOREIGN PATENTS

| | | |
|---|---|---|
| 387,430 | France | July 9, 1908 |
| 370,985 | Germany | Mar. 9, 1923 |

OTHER REFERENCES

Catalog of the Zimmer Mfg. Co., of Bourbon, Ind., issued August 1947, pages 60–61. (Copy in Div. 55.)